Patented Dec. 27, 1949

2,492,417

UNITED STATES PATENT OFFICE 2,492,417

PHOTOCHEMICAL CHLORINATION OF LONG CHAIN COMPOUNDS

Vincent J. Frilette, New York, N. Y., assignor, by mesne assignments, to Pierce Laboratory, Inc., New York, N. Y., a corporation of New York No Drawing. Application January 18, 1945, Serial No. 573,472

6 Claims. (Cl. 204—161)

This invention relates to chlorination of certain organic materials, such as fatty oils, fatty acids, and petroleum hydrocarbons.

The invention is particularly concerned with an improved chlorination process according to which it is possible in a simple, effective, and economical manner to produce highly chlorinated organic materials in the form of powder or powdery precipitates.

It has long been known that various organic materials may be chlorinated by dissolving the materials in carbon tetrachloride and bubbling chlorine gas through the solution. In certain known processes of this type, after the bubbling of chlorine gas, carbon tetrachloride was driven off or volatilized by warming the solution and/or applying vacuum. Depending upon the degree of chlorination, this yielded a liquid or semi-solid chlorinated product, and sometimes a product of more or less solid, resinous consistency.

The present invention contemplates certain improvements over all of the prior methods described above. According to the present invention, instead of employing carbon tetrachloride as the solvent for the organic material during chlorination, I employ an acid selected from the class consisting of acetic acid, mono-chloroacetic acid, di-chloroacetic acid, tri-chloroacetic acid and propionic acid. Acetic acid (glacial) is preferred, in part because of its high solubility in water, which characteristic is of importance in a subsequent phase of the process. In general, relatively water-free acids are preferred, although the presence of some water, say 10%, will not prevent chlorination.

After extensive chlorination of the organic material in the acid solvent, the present invention contemplates precipitation of the chlorinated material by mixing the solution with water, preferably at a temperature appreciably below the boiling temperature, for example in the neighborhood of room temperature or somewhat lower.

I have found that extensive chlorination of organic materials of the character above mentioned takes place upon bubbling chlorine gas through a solution of the organic material in acetic acid, and that separation of the chlorinated organic material may be effected in a manner yielding a powder or powdery product by admixture and agitation of the solution with water at temperatures ordinarily encountered in the normal water supply lines.

The foregoing procedure has a number of very marked advantages in the chlorination of organic materials of the types here under consideration. In the first place, acetic acid (and also the other acid solvents above mentioned) has a considerably higher boiling point than does carbon tetrachloride, in view of which the chlorination can be carried out at a higher temperature than is practicable when employing carbon tetrachloride as the solvent. The higher temperature, in turn, is of advantage because at the higher temperature the solution has a lower viscosity which enables increasing the concentration of the organic material in the solvent, as compared with the upper limit of the practicable range when employing carbon tetrachloride as solvent. In connection with this point it should be kept in mind that when organic materials are extensively chlorinated in a solvent, toward the end of the chlorination the viscosity of the solution increases to such an extent as to hinder the dispersion of the chlorine gas therethrough. When employing acetic acid it is possible to adopt a concentration of the organic material in the acid such that at the end of the chlorination, the chlorinated material constitutes as much as 70 to 75% of the solution by weight, which is far beyond the practicable limit of final concentration when chlorinating in the presence of carbon tetrachloride.

Another advantage in employing acetic acid is its greater solubility for the chlorinated material, as compared with that of carbon tetrachloride. This tends further to reduce the viscosity.

Still another advantage of the employment of acetic acid as solvent is that after the chlorination is completed, the acetic acid of the solution is still readily soluble even in cold water. It is, of course, of enormous practical advantage to be able to employ water as a precipitant, but when carbon tetrachloride is used as solvent for the organic material, separation of the chlorinated material can only be effected with water at or close to the boiling point so as to volatilize the carbon tetrachloride, the carbon tetrachloride not being soluble in water. With organic materials of the types here under consideration, elevation of the temperature thereof to a point at or close to the boiling point of water has a tendency to soften the chlorinated material or at least to render the same sticky so that it adheres to the walls of the treatment vessel, agitator and the like. At the lower water temperatures, which are practicable to employ when acetic acid is used as solvent, the chlorinated material is not softened and does not adhere to the treatment equipment.

Various of the objects and advantages set out above and various of the preferred treatment conditions are discussed herebelow. At this point, however, attention is directed to the range of organic materials contemplated for treatment according to this invention.

Organic materials of the class contemplated for treatment according to this invention comprise long chain esters, fatty acids and petroleum hydrocarbons. The naturally accurring long chain esters, fatty acids and petroleum hydrocarbons are perhaps the most important organic materials capable of use according to the invention, although it may also be mentioned that synthetically prepared esters, fatty acids and hydrocarbons having molecular structure substantially simulating the general molecular structure of the naturally occurring materials may also be employed. For example, those known types of synthetic fatty acids and esters having odd numbers of carbon atoms in the carbon chain are considered herein to be of similar molecular structure to the natural fatty acids and esters most of which, as is known, have carbon chains incorporating even numbers of carbon atoms.

Esters which are suitable for the purpose are esters of carboxylic acids of the long chain type having at least 12 carbon atoms in the chain. Such esters may either be natural or synthetic. Typical esters are the naturally occurring animal and vegetable oils, mono-, di-, and poly-esters of natural and synthetic fatty acids and alcohols, for example: linseed oil, soya bean oil and castor oil.

Fatty acids which are suitable for use according to this invention are fatty acids of the long chain type having at least 12 carbon atoms in the chain, for example, stearic acid, oleic acid, linoleic acid, linseed oil fatty acids, soya bean oil fatty acids, castor oil fatty acids, and cocoanut oil fatty acids.

Petroleum hydrocarbons suitable for use according to the invention preferably are of the long chain type, having a carbon chain of at least 15 and preferably more than 25 carbon atoms, for instance mineral oils, petroleum jelly and paraffin waxes.

In a typical chlorination, the organic material selected is mixed with the acid, for example, acetic acid. The initial content of the organic material in the mixture may be anywhere up to about 60% of the mixture, preferably from about 30% to about 50%. It is of advantage to employ a concentration toward the upper end of the range indicated, because this reduces the volume of solvent required to be handled during the course of the treatment and particularly at the time of precipitation of the chlorinated material. The practicable concentration will vary somewhat depending upon the particular organic material being chlorinated, since some of the chlorinated materials are of higher viscosity than others. In each case the limiting factor is that concentration which, toward the end of the chlorination and at an elevated temperature, will yield a solution of reasonable fluidity so that the dispersion or bubbling of the chlorine gas toward the end of the chlorination will not be unduly hindered.

It may be mentioned that in some cases the organic material may not be soluble in acetic acid until at least a portion of the chlorination has taken place. In many cases the acetic acid need not necessarily be present until at least some chlorination has taken place.

Chlorination may sometimes be facilitated by addition of a small amount of acetic anhydride.

The dispersion of the selected organic material in the acid is then subjected to treatment with chlorine gas, preferably by dispersing the gas therein. It is of importance that during the chlorination the material be exposed to catalytic light. This may be accomplished by any of the known forms of photochemical catalytic equipment. A glass reaction vessel with ordinary incandescent electric lights exteriorly of the vessel in reasonably close proximity will serve the purpose. Sunlight may also be used for the purpose, provided it is of reasonable intensity and provided the depth of material through which the rays must penetrate is not too great.

During the treatment with chlorine gas the temperature of the solution tends to rise as a result of the reactions taking place. Toward the end of the chlorination period the temperature may drop off somewhat. Pre-warming of the materials may be of advantage, particularly where the organic material is solid at room temperature during the chlorination. The application of heat is not essential because of the exothermic character of the chlorination itself, but preferably the temperature, at least toward the end of the chlorination, is maintained at from about 75° C. to about 115° C. In contrast with prior chlorination methods employing carbon tetrachloride as solvent, the temperature range here indicated is entirely practicable since the boiling point of the acid solvent here employed is considerably higher than the boiling point of carbon tetrachloride and further because the acetic acid is more readily recoverable upon cooling the exit gases. Moreover, the maintenance of a somewhat elevated temperature renders the solution more fluid and because of this enables employment of higher concentrations of organic material in the acid solvent.

The chlorination is continued until the molecule of the organic material contains at least 40% of combined chlorine, and preferably upwards of about 50% of combined chlorine, for instance from 60 to 70%, or even somewhat higher. This is of advantage when securing a friable precipitate and is especially important when securing a powder precipitate during the subsequent precipitation of the chlorinated material in water.

With respect to the acid solvent, it should be noted that even where acetic acid is initially employed, toward the end of the chlorination at least some chloroacetic acids may be present as a result of the reaction of the chlorine gas with the acetic acid.

It may further be mentioned that in some instances, for example when unsaturated esters are being chlorinated, some acetic acid enters into the reaction, possibly forming a condensation compound. In the case of fatty acids and petroleum hydrocarbons, for instance paraffin waxes, the chlorinated product apparently is unaltered, at least to any appreciable extent, by reaction with the acid used.

Any excess chlorine gas leaving the reaction vessel may be suitably recovered and reused; and the hydrogen chloride evolved may also be recovered and used if desired.

When the chlorination has been carried to the desired extent the solution (acid solvent and chlorinated organic material) is introduced into water and agitated, with the result that the solvency of the acid for the product is lost and the chlorinated product readily precipitates from the water and acid.

Although the loss of solvency of the acid for the product and the consequent precipitation may be effected by employing water at temperatures even as high as the boiling point, it is of great practical advantage that a powder precipitate can be secured by employing water at temperatures appreciably below the boiling point of water. At or close to the boiling point of water even very highly chlorinated organic materials of the class here under consideration tend to become sticky or even to soften with resultant adherence of the chlorinated product to the reaction vessel, agitator, etc. Because of this, where a powdery type product is desired, precipitation should be effected at a temperature below about 70° C., and preferably below about 30° C.

Precipitation of the chlorinated product takes place with great ease, even without any extensive agitation.

Precipitated ester and hydrocarbon products are preferably washed with an aqueous alkaline solution to assist in removing any entrained acetic acids. For this purpose solutions of sodium, calcium or potassium carbonates or hydroxides may be used. If desired an aqueous alkaline solution may be used as the initial precipitant. In the case of chlorinated fatty acids use of alkalies should, in general, be avoided.

EXAMPLES

There is presented herebelow a full description of a typical treatment according to the invention (Example 1), after which the results of a number of other examples carried out in the same general manner are given in tabular form.

*Example 1*

In this example alkali refined linseed oil was chlorinated in glacial acetic acid, the linseed oil initially constituting 35% of the mixture by weight. A batch comprising 87.5 grams of oil and 163 grams of acetic acid was placed in a glass reaction vessel and chlorine gas was bubbled through for about 5 hours, a total of 350 grams of chlorine gas being passed during the treatment period. While the material was subjected to the chlorine gas, a strong incandescent electric lamp was placed nearby to catalyze the reaction. No heat was applied, although the temperature rose in consequence of the reaction.

After chlorination, nitrogen was bubbled through to remove dissolved free chlorine.

The solution was thereafter poured into about 1500 ml. of water at room temperature and stirred. A white powder precipitate formed and this was filtered and then washed and slurried repeatedly with water washes each comprising 1500 ml. The first and third out of four washes contained 1% sodium carbonate.

Finally the washed precipitate was dried in an oven at 40° C. The dry powder product weighed 211.5 grams and had a chlorine content of 55.9%. The yield was therefore 107.5%, possibly because of some acetic acid combining with the molecule.

The product comprised a free flowing white powder and remained so after extended standing.

*Examples 2–7*

In this group of examples various different organic materials in the class contemplated for treatment according to the invention were chlorinated in the presence of acetic acid and were thereafter precipitated in water approximately at room temperature. The initial concentration of the material was different in different examples, as was the time of treatment and the quantity of chlorine gas bubbled through. In most cases an excess of chlorine gas was used although, as will be seen from Example 7, virtually 100% efficiency in use or "pick-up" of chlorine gas is possible under appropriately controlled conditions.

In all examples incandescent electric bulbs were used to supply the catalytic light and the products all constituted powder precipitates of a white or whitish color, the powder particles being resistant to coalescence on standing at room temperature.

The materials treated and some of the variables introduced during the chlorination itself are indicated below in Table Ia. Table Ib gives further data on this same group of examples including the chlorine pickup efficiency, the nature of the washes employed after precipitation, the yield and also the chlorine content of the final product.

For the sake of comparison, the pertinent data given above in connection with Example 1 is also reproduced in the tables.

*Table Ia*

| Ex. No. | Organic Material | Initial Concentration, Percent | Time of Chlorination, Hours | Temp. Control, °C. | Final Concentration, Percent |
|---|---|---|---|---|---|
| 1 | Alkali Refined Linseed Oil | 35 | 5 | None | 57.5 |
| 2 | ----do---- | 10 | 4 | ----do---- | 18.3 |
| 3 | ----do---- | 50 | 30½ | Held at 65° | 70.5 |
| 4 | Nujol (heavy mineral oil) | 35 | 9 | None | 53.7 |
| 5 | Oleic Acid | 35 | 13 | 80–90° | 62.3 |
| 6 | Paraffin (M. P. 56–58° C.) | 35 | 5 | Initially heated to 80°, none during. | 58.4 |
| 7 | Paraffin | 35 | 9 | Held at 80° | 61.8 |

*Table Ib*

| Ex. No. | Organic Material | Washes | Chlorine Pick-up Efficiency, Percent | Chlorine Content, Percent |
|---|---|---|---|---|
| 1 | Alkali Refined Linseed Oil | 2 1%—$Na_2CO_3$ / 2 $H_2O$ | 59.5 | 55.9 |
| 2 | ----do---- | 1 1%—$Na_2CO_3$ / 3 $H_2O$ | 13.7 | 52.3 |
| 3 | ----do---- | 2 1%—$Na_2CO_3$ / 2 $H_2O$ | 74.5 | 55.6 |
| 4 | Nujol (heavy mineral oil) | 2 1%—$Na_2CO_3$ / 2 $H_2O$ | ---------- | 60.6 |
| 5 | Oleic Acid | 4 $H_2O$ | ---------- | 68.0 |
| 6 | Paraffin (M. P. 56–58° C.) | 2 1%—$Na_2CO_3$ / 2 $H_2O$ | 83.9 | 66.1 |
| 7 | Paraffin | 2 1%—$Na_2CO_3$ / 2 $H_2O$ | 100.0 | 68.9 |

Examples 8–11

In this group of examples paraffin was chlorinated in each of the several solvents herein proposed for use during chlorination. In general, the conditions of each of the examples were similar to the procedure described above in connection with Example 1.

Electric light bulbs were employed as a source of catalyzing light. When the solvent and paraffin were mixed in preparation for chlorination, the materials were warmed to facilitate dispersion. During bubbling of chlorine gas the temperature was controlled in each example at about 70–75° C. All of the products were precipitated in cold water.

The concentration of paraffin in the solvent in each example is indicated in Table II herebelow, which table also indicates the washes employed subsequent to precipitation, as well as the chlorine content of the product.

All of the products were white or whitish powder precipitates. For purposes of comparison the corresponding data for Example 6 above are also included in Table II.

Table II

| Ex. No. | Acid Solvent | Initial Concentration, Percent | Washes | Chlorine Content, Percent |
|---|---|---|---|---|
| 6 | Acetic | 35 | 2 1%—$Na_2CO_3$ / 2 $H_2O$ | 66.1 |
| 8 | Mono-chloroacetic | 33 | 5 $H_2O$ | 66.4 |
| 9 | Di-chloroacetic | 33 | 2 5%—$Na_2CO_3$ / 2 $H_2O$ | 62.4 |
| 10 | Tri-chloroacetic | 33 | 2 5%—$Na_2CO_3$ / 2 $H_2O$ | 64.4 |
| 11 | Propionic | 20 | 4 $H_2O$ | 69.8 |

I claim:

1. A method for producing powdery chlorinated organic materials, which method comprises chlorinating an organic material selected from the class consisting of esters of fatty acids having a carbon chain of at least twelve carbon atoms, fatty acids having a carbon chain of at least twelve carbon atoms and petroleum hydrocarbons having a carbon chain of at least fifteen carbon atoms, by dispersing the material in a solvent selected from the class consisting of acetic acid, monochloroacetic acid, di-chloroacetic acid, tri-chloroacetic acid and propionic acid, and dispersing chlorine gas through the solution while the solution is exposed to the catalyzing influence of visible light, the dispersing of chlorine gas being continued until the molecule of the chlorinated organic material contains at least 40% combined chlorine, and agitating the solution of the chlorinated material with water at a temperature below 70° C. to effect separation of the chlorinated material as a powdery precipitate.

2. A method according to claim 1 in which the solvent employed is acetic acid.

3. A method according to claim 1 in which the solvent employed is a chloroacetic acid.

4. A method according to claim 1 in which the solvent employed is propionic acid.

5. A method according to claim 1 in which the step of dispersing chlorine gas is continued until the molecule of the chlorinated organic material contains at least 50% combined chlorine.

6. A method according to claim 1 in which the water employed for precipitation is at a temperature below about 30° C.

VINCENT J. FRILETTE.

REFERENCES CITED

The following references are of record in the file of this patent:

UNITED STATES PATENTS

| Number | Name | Date |
|---|---|---|
| 1,129,165 | Buchner | Feb. 23, 1915 |
| 1,191,916 | Brooks et al. | July 18, 1916 |
| 1,862,596 | Keller et al. | June 14, 1932 |
| 2,183,556 | Fawcett | Dec. 19, 1939 |
| 2,268,415 | Morway | Dec. 30, 1941 |
| 2,315,037 | Bannon | Mar. 30, 1943 |

FOREIGN PATENTS

| Number | Country | Date |
|---|---|---|
| 150,434 | Germany | Apr. 13, 1904 |

OTHER REFERENCES

Ellis, Chemistry of Petroleum Derivatives, vol. I (1934), page 11.

Certificate of Correction

Patent No. 2,492,417                                December 27, 1949

VINCENT J. FRILETTE

It is hereby certified that errors appear in the printed specification of the above numbered patent requiring correction as follows:

Column 4, line 12, strike out the words "during the chlorination" and insert the same in line 13, after "heat";

and that the said Letters Patent should be read with these corrections therein that the same may conform to the record of the case in the Patent Office.

Signed and sealed this 18th day of April, A. D. 1950.

[SEAL]

THOMAS F. MURPHY,
*Assistant Commissioner of Patents.*